United States Patent [19]
Pantzar

[11] Patent Number: 5,544,984
[45] Date of Patent: Aug. 13, 1996

[54] CUTTING INSERT WITH TWISTED CHIP SURFACE

[75] Inventor: Göran Pantzar, Årsunda, Sweden

[73] Assignee: Sandvik AB, Sandviken, Sweden

[21] Appl. No.: 185,371

[22] Filed: Jan. 24, 1994

[30] Foreign Application Priority Data

Jan. 27, 1993 [SE] Sweden ................................ 9300234

[51] Int. Cl.$^6$ ....................................... B23C 5/02
[52] U.S. Cl. .................................. 407/113; 407/114
[58] Field of Search ..................... 407/113, 114

[56] References Cited

U.S. PATENT DOCUMENTS

| | | | |
|---|---|---|---|
| 3,786,540 | 1/1974 | Lundgren | 407/114 |
| 3,882,580 | 5/1975 | Lundgren | 407/114 |
| 4,059,363 | 11/1977 | Romagnolo . | |
| 4,632,607 | 12/1986 | Pantzar . | |
| 4,940,363 | 7/1990 | Aebi et al. | 407/42 |
| 5,052,863 | 10/1991 | Satran | 407/113 |
| 5,071,292 | 12/1991 | Satran | 407/116 |
| 5,145,295 | 9/1992 | Satran . | |
| 5,199,827 | 4/1993 | Pantzar . | |

FOREIGN PATENT DOCUMENTS

| | | |
|---|---|---|
| 0555192 | 8/1993 | European Pat. Off. . |
| 456564 | 10/1988 | Sweden . |
| 646691 | 5/1991 | U.S.S.R. . |

*Primary Examiner*—Maurina T. Rachuba
*Attorney, Agent, or Firm*—Burns, Doane, Swecker & Mathis, L.L.P

[57] ABSTRACT

An indexable cutting insert comprises an upper surface, a bottom surface and side surfaces extending therebetween. Between two cutting corners, the rake surface is formed such that the rake angle is largest next to the two cutting corners and smallest at a point somewhere between the two cutting corners, preferably at or near the middle of the cutting edge. In this way, the cutting edge is strongest where the pressure load from the workpiece is largest, at the same time as a relatively small average rake angle is attained. This configuration decreases the cutting forces and the energy consumption.

9 Claims, 1 Drawing Sheet

CUTTING INSERT WITH TWISTED CHIP SURFACE

BACKGROUND AND SUMMARY OF THE PRESENT INVENTION

The present invention relates to a cutting insert for chip forming machining tools, in particular milling cutters. The insert is preferably made by form pressing and sintering of an insert-forming powder. The insert comprises an upper side or chip surface, a lower, planar bottom surface which can be located into abutment with a cooperating bottom support surface of the machining tool, and at least three side surfaces extending between the upper and lower surfaces. At least one of the side surfaces adjoins the chip surface along a line that constitutes a cutting edge.

Such inserts are more and more produced by a direct pressing method during which a cemented carbide forming powder first is shaped into a desired form in a suitable pressing tool and then is given final strength by sintering in an oven at temperatures above 1000° C. The pressing operation has been sophisticated over the years and is nowadays so well defined that the process provides good possibilities of forming the cutting edge and adjacent chip forming surfaces, possible reinforcing chamfers and clearance surfaces with great exactitude. Moreover, the shrinkage involved in the process is taken into account during the dimensioning of the pressing tool.

Today's cutting geometries tend to be more and more positive, i.e., larger and larger angles between the chip or rake surface of the insert and the normal to the machined surface. The reason for this geometry is that one obtains several advantages thereby, such as a small cutting force and thus a low energy consumption, a well defined cutting edge for high measure precision, and a wider liberty when selecting relief angle while maintaining a positive cutting geometry. In practice, the limit for the positivity of the chip surface is determined by the strength of the cemented carbide, since the edge angle becomes sharper, and thus weaker, the more positive the chip surface is.

Thus, a first object of the present invention is to make a cutting insert with a chip or rake angle as positive as possible in order to minimize the cutting forces.

A second object of the present invention is to make a cutting insert that reduces, or even eliminates, chipping and breakage of the cutting edge, while at the same time paying due attention to the first mentioned object.

The present invention has in a surprising way managed to satisfy both these, seemingly incompatible objects. This has been accomplished, in part, by forming the insert with a portion of the upper surface that extends along and adjacent to at least one cutting edge as a helically twisted rake surface, whereby the rake angle of this rake surface decreases from an operative cutting corner towards a point along the cutting edge. Thereafter, the rake angle increases from the point on the cutting edge towards a next adjacent cutting insert corner.

Thus, by forming the insert with the largest rake angle nearest to two adjacent cutting corners, and the smallest rake angle at a point somewhere along the cutting edge between these two corners, preferably at the middle of the cutting edge, several advantages have been attained. The total cutting force at large cutting depths has been reduced thanks to the increasing rake angle at maximal cutting depth. At the same time, chipping or breakage of the cutting edge is substantially eliminated even after long machining times. Further, the cutting edge is strongest at a point at which, or in whose proximity, the largest load will be exerted, i.e., at large cutting depths. In order to make the "average rake angle" as large as possible, and thereby the cutting force as small as possible, the rake angle is increased again towards the adjacent operative corner. Thus, by the present invention one has achieved a very positive cutting geometry with a high strength.

BRIEF DESCRIPTION OF THE DRAWINGS

For illustrative but non limiting purposes, a preferred embodiment of the invention will now be described in more detail with reference to the appended drawings, wherein like members bear like reference numerals, and wherein.

DETAILED DESCRIPTION OF THE PREFERRED EMBODIMENT

Figure 1:
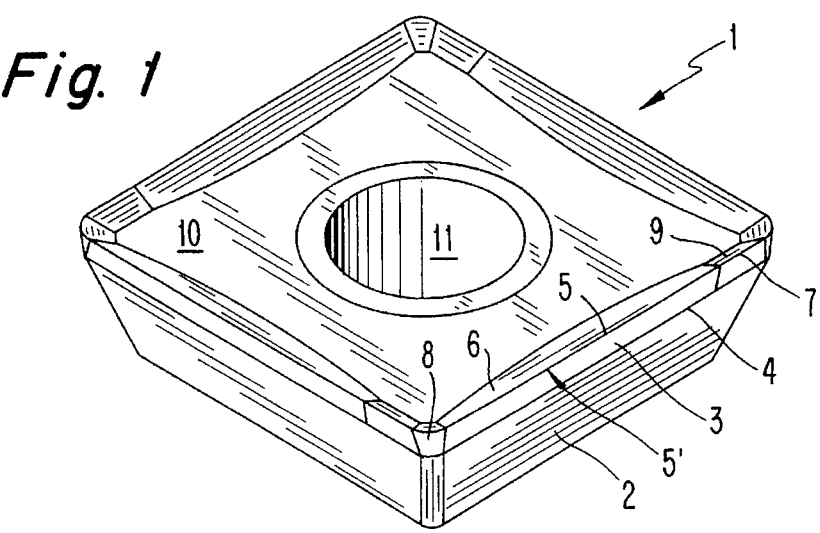
FIG. 1 is a perspective view of a cutting insert according to the present invention, obliquely from above.
Figure 2:
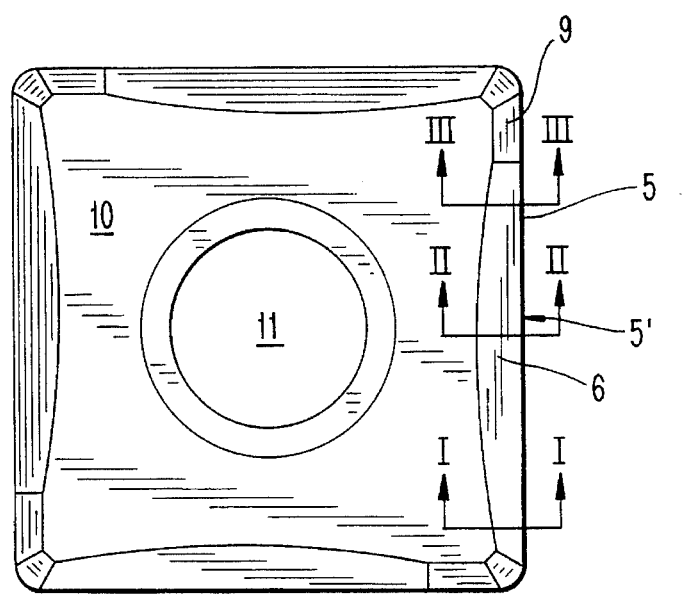
FIG. 2 is a top view of the insert according to the present invention.

With reference to FIGS. 1 and 2, an indexable cutting insert 1 of square basic form comprises a substantially planar upper side or chip surface 10 and a bottom surface which is substantially plane-parallel with the upper surface 10. Between the chip surface 10 and the bottom surface, side surfaces 2 extend which are substantially alike on all four sides. Smoothly rounded portions 8 are provided at the corners of the insert. Main cutting edges 5 are formed at the intersections between the side surfaces and the chip surface. Underneath and adjacent to each main cutting edge 5, a relief surface 3 is provided. Each relief surface 3 intersects with a respective side surface 2 along a break line 4. The two surfaces form an obtuse angle with each other, normally between 160° and 179°, at the break line 4.

The geometric configuration of the relief and side surfaces, respectively, is not a critical feature of the present invention. According to known technique the relief and side surfaces form an obtuse angle with the bottom surface and an acute angle with the upper or chip surface in order to make possible sufficient clearance under the cutting edge. A usual clearance angle can be between 5° and 15°. Alternatively, the side surface between chip surface and bottom surface can be constituted by one single plane surface rather than two surfaces as illustrated.

Adjacent to each cutting corner is a main cutting edge 5 and a secondary cutting edge 7. The cutting edge 7 has a rake surface 9. As known, the object of the secondary cutting edge 7 is to generate the new surface on the workpiece, while the object of the main cutting edge 5 is to cut chips out of the workpiece. The angle between the secondary cutting edge 7 and the end of the adjacent main cutting edge 5 can suitably vary from 0.5° to 20°, preferably from 1° to 10°.

Between the main cutting edges 5 and the upper surface 10, rake surfaces 6 extend. According to FIG. 1, the rake surfaces 6 rise above the plane of the upper surface 10 and are shaped with a helically twisted surface along the whole length of the main cutting edge 5. Starting from an operative cutting corner, the rake surface 6 is first twisted clockwise, whereby the rake angle diminishes or decreases, up to a point 5' along the main cutting edge 5 between the operative cutting corner and an adjacent cutting corner. Thereafter, the rake angle increases again, up to the adjacent rake surface 9 of the secondary cutting edge 7. In other words, the rake angle is at a maximum adjacent the cutting insert corners and smallest at a point 5' therebetween.

Figure 3A:
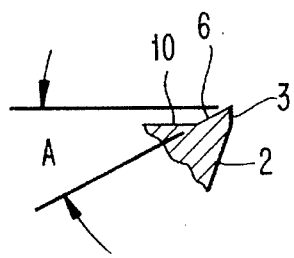
FIGS. 3a, 3b and 3c are cross-sectional views along the lines I—I, II—II and III—III in FIG. 2.
Figure 3B:
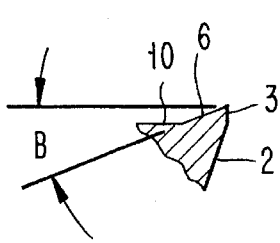
Figure 3C:
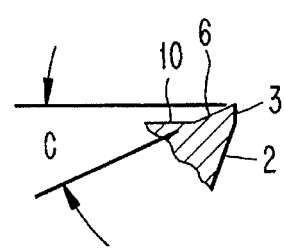

Suitably, the point 5' with the smallest rake angle is situated at a distance from the operative cutting corner which corresponds to between ¼ and ¾ of the length of the main cutting edge, and preferably in the immediate proximity of its middle, in accordance with the embodiment in the drawings. The degree of twisting of the angle of the rake surface 6 can be seen in FIGS. 3a, 3b and 3c. Thus, starting off from an operative cutting corner, the rake angle is first between 15° and 35° (see angle A is FIG. 3a), whereafter it decreases to between 10° and 30° at the middle of the main cutting edge (see angle B in FIG. 3b). According to the illustrated embodiment, the distance from angle A to angle B is approximately one half the distance of the cutting edge, i.e., in a usual insert approximately 5 and 6 min. Thereafter, the rake angle increases again towards the adjacent secondary cutting edge and amounts to a value of between 15° and 35° (see angle C in FIG. 3c), i.e., the same value as nearest to the operative cutting corner. Preferably, the rake angles at the ends of the main cutting edge are between 20° and 30° and at its middle between 15° and 25°, provided that the rake angle at the middle is the smallest.

Alternatively, the main cutting edge 5 can extend from corner to corner, thus eliminating the secondary cutting edges 7. However, the largest angle again is adjacent the insert corners.

The upper surface 10 can be provided with chip breaking arrangements known per se, such as ridges, bumps, dimples, etc.

Obviously, the invention is not restricted to cutting inserts having a square basic form. Thus, it is also feasible to apply the invention on other polygonal basic forms, such as on rectangular, rhombic or triangular inserts. Furthermore, not necessarily all main cutting edges on an insert have to be provided with a helically twisted rake surface.

The insert of the invention is preferably provided with a central through-hole 11 for the insertion of a suitable clamping means, such as a screw, a locking pin, etc.

According to the described embodiment, the main cutting edge is straight throughout its length. However, the cutting edge can also be slightly curved outwards, in order to compensate for the positive, or occasionally negative, axial inclination of the insert in the machining tool, thus further guaranteeing a completely plane machined surface.

The principles, preferred embodiment and mode of operation of the present invention have been described in the foregoing specification. However, the invention which is intended to be protected is not limited to the embodiments disclosed, but rather is defined by the appended claims. Variations and changes may be made that fall within the spirit and scope of the present invention as defined in those appended claims.

What is claimed is:

1. A milling cutting insert for chip forming machining tools, comprising an upper surface, a lower, planar bottom surface which is adapted to be placed into abutment with a cooperating support surface of the machining tool, at least three side surfaces extending between the upper and lower surfaces, at least one of the side surfaces adjoining a helically twisted rake surface along a line that forms a main cutting edge, a plurality of operative cutting insert corners, said at least one of the side surfaces adjoining the upper surface along a line that forms a secondary cutting edge, the secondary cutting edge disposed adjacent said main cutting edge and being non-collinear therewith, said helically twisted rake surface having a rake angle decreasing from an operative cutting corner towards a point along the main cutting edge, the rake angle increasing from said point towards the secondary cutting edge adjacent a next operative cutting insert corner, the upper surface comprising a planar central surface with rake surfaces located around the central surface, the rake surfaces rising above the plane of the central surface, at least one of the rake surfaces comprising said helically twisted rake surface.

2. The insert according to claim 1, wherein the rake angle of the helically twisted rake surface next to one of the operative cutting insert corners and the secondary cutting edge between 15° and 35°, and the rake angle at the point along the main cutting edge is between 10° and 30°.

3. The insert according to claim 2, wherein the rake angle of the surface nearest the corners is between 20° and 30°.

4. The insert according to claim 2, wherein the rake angle of the surface at the point is between 15° and 25°.

5. The insert according to claim 1, wherein the point with the smallest rake angle is located at a distance from one of the operative cutting corners corresponding to between ¼ and ¾ of the length of the main cutting edge.

6. The insert according to claim 1, wherein the point with the smallest rake angle is substantially at the middle of the main cutting edge.

7. The insert according to claim 1, wherein the main cutting edge is straight.

8. The insert according to claim 1, wherein the insert is produced by form pressing and sintering of a powder of insert-forming material.

9. A milling cutting insert for chip forming milling cutters, comprising an upper surface, a lower, planar bottom surface which is adapted to be placed into abutment with a cooperating support surface of the machining tool, at least three side surfaces extending between the upper and lower surfaces, at least one of the side surfaces adjoining a rake surface along a line that forms a main cutting edge along one side of the insert, said at least one of the side surfaces adjoining the upper surface along a line that forms a secondary-cutting edge, the secondary cutting edge disposed adjacent said main cutting edge and being non-colinear therewith, the rake surface having a rake angle being largest most closely adjacent the two ends of the main cutting edge along the side and smallest at a point along the main cutting edge between the two ends of the main cutting edge, the upper surface comprising a planar central surface with rake surfaces located around the central surface, the rake surfaces rising above the plane of the central surface, at least one of the rake surfaces comprising said helically twisted rake surface.

\* \* \* \* \*